United States Patent Office 2,872,189
Patented Feb. 3, 1959

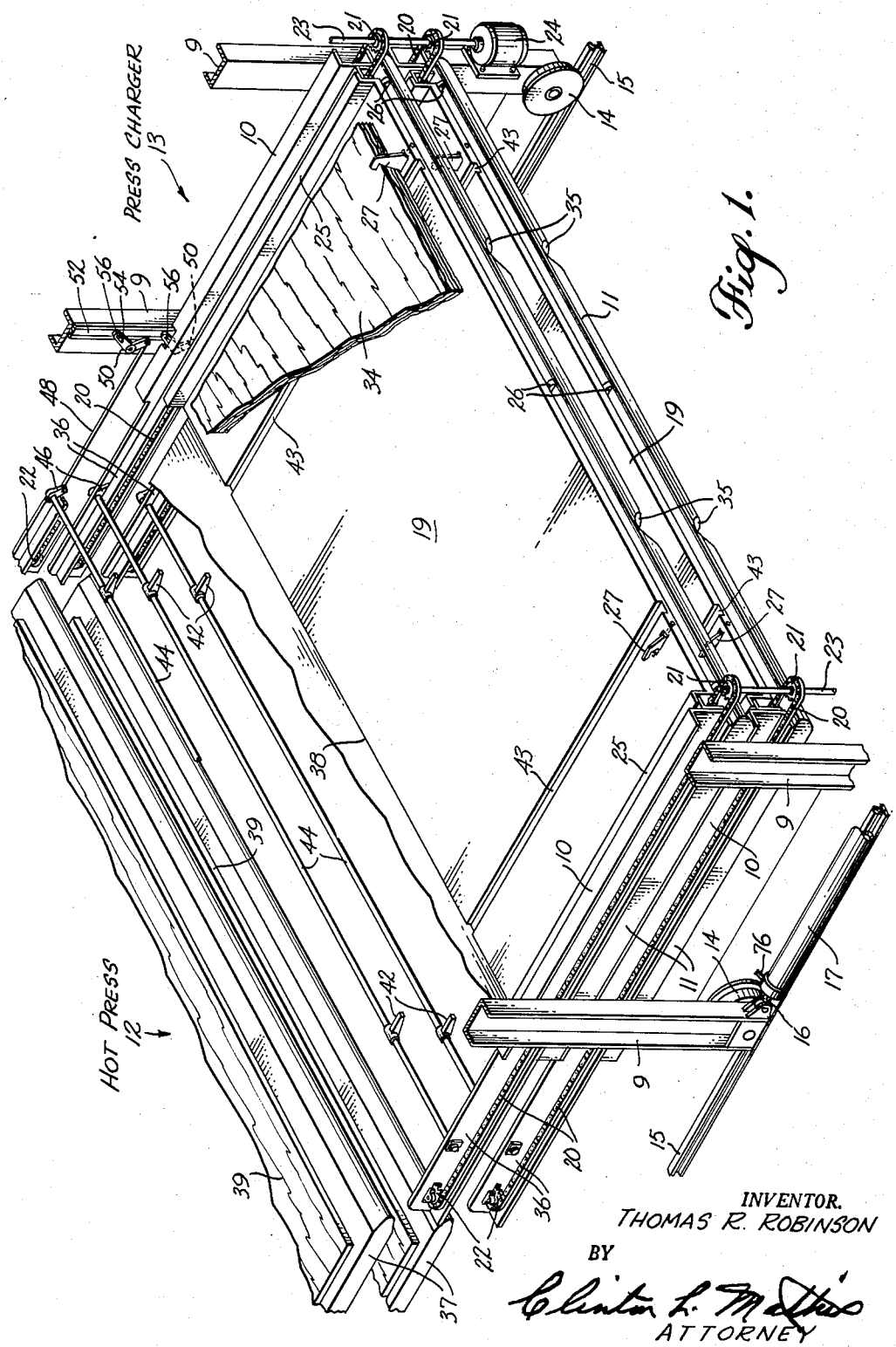

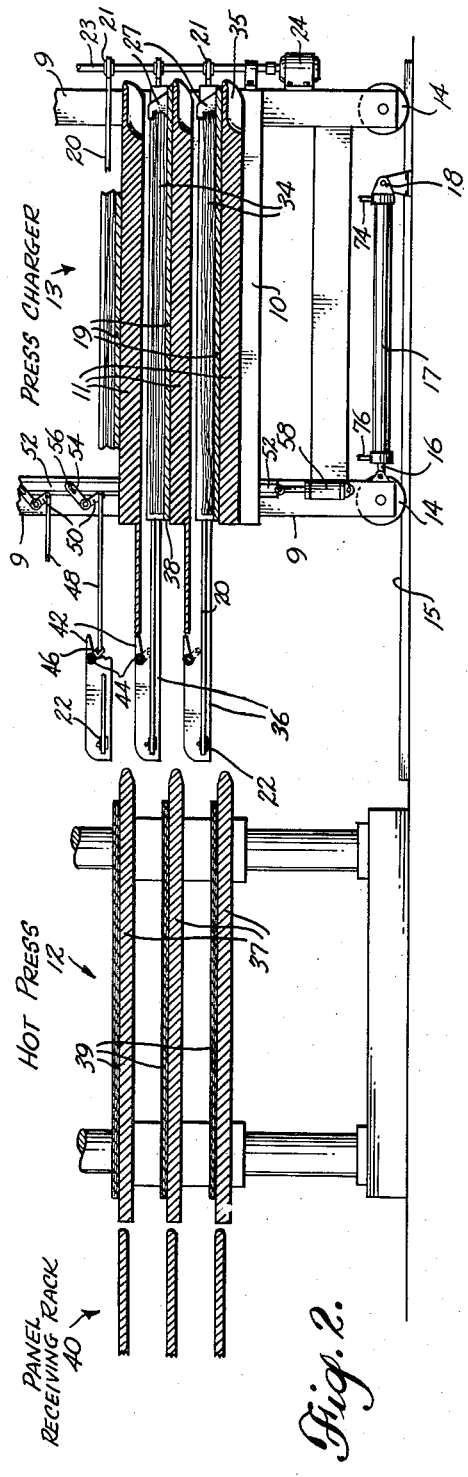

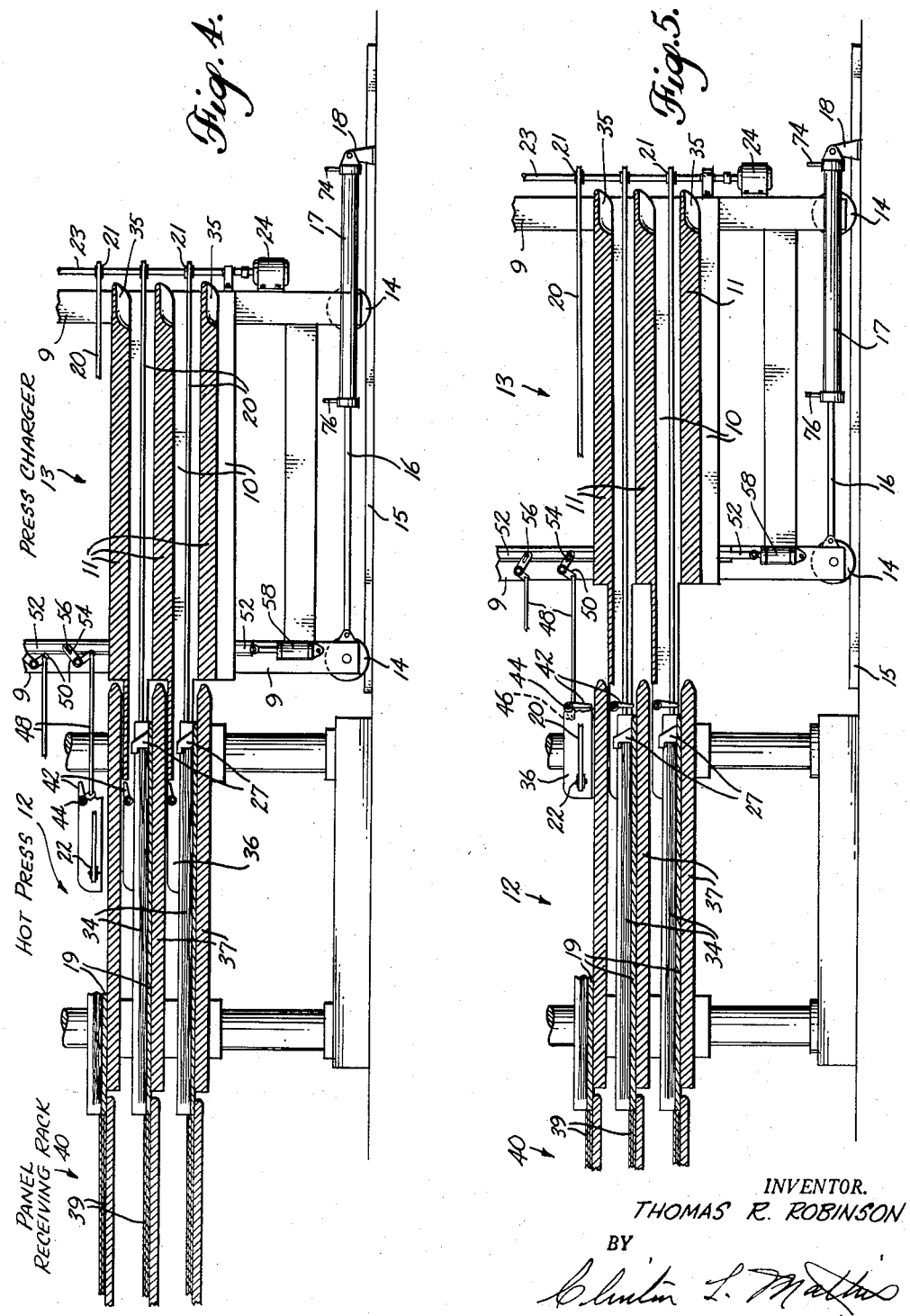

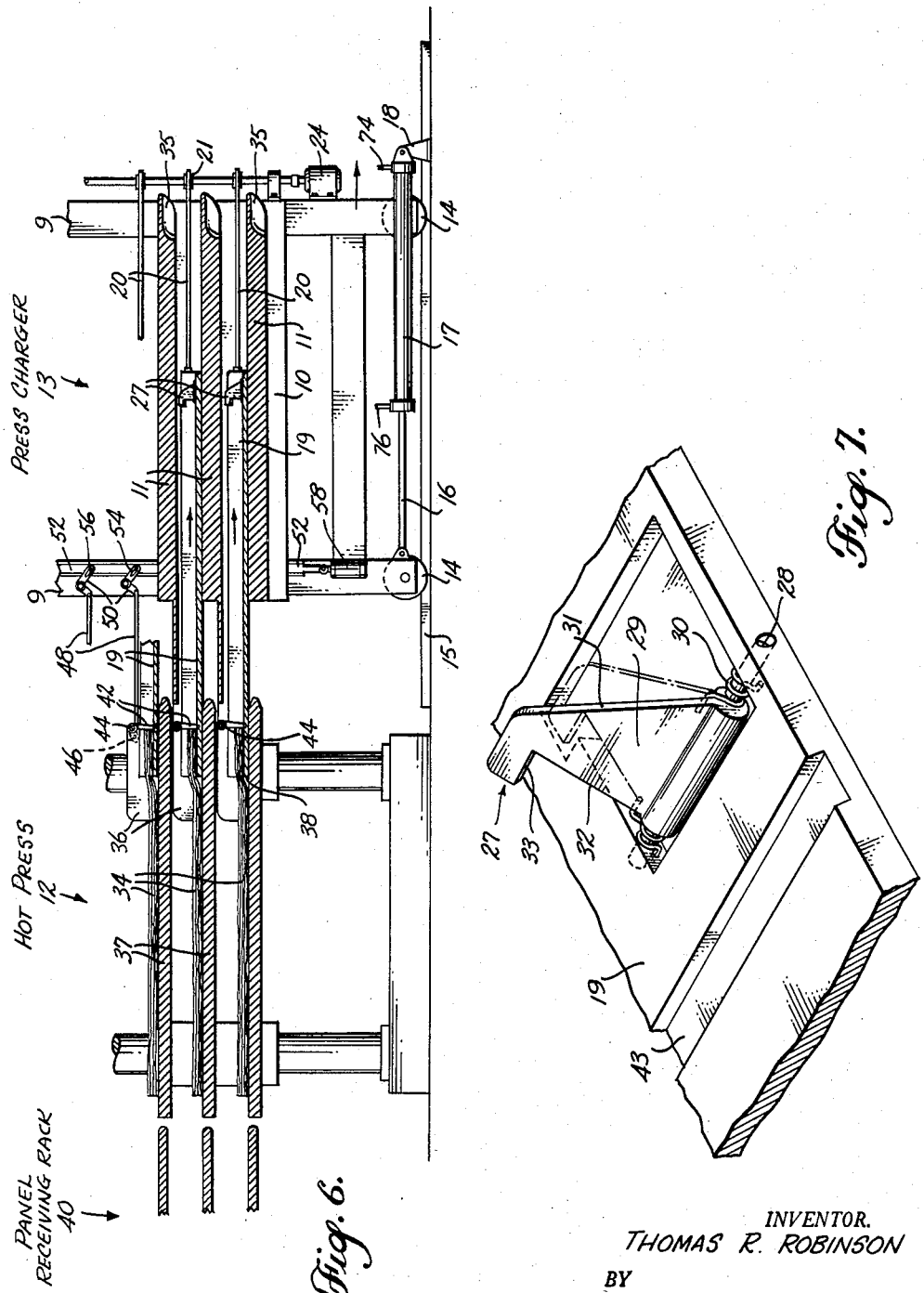

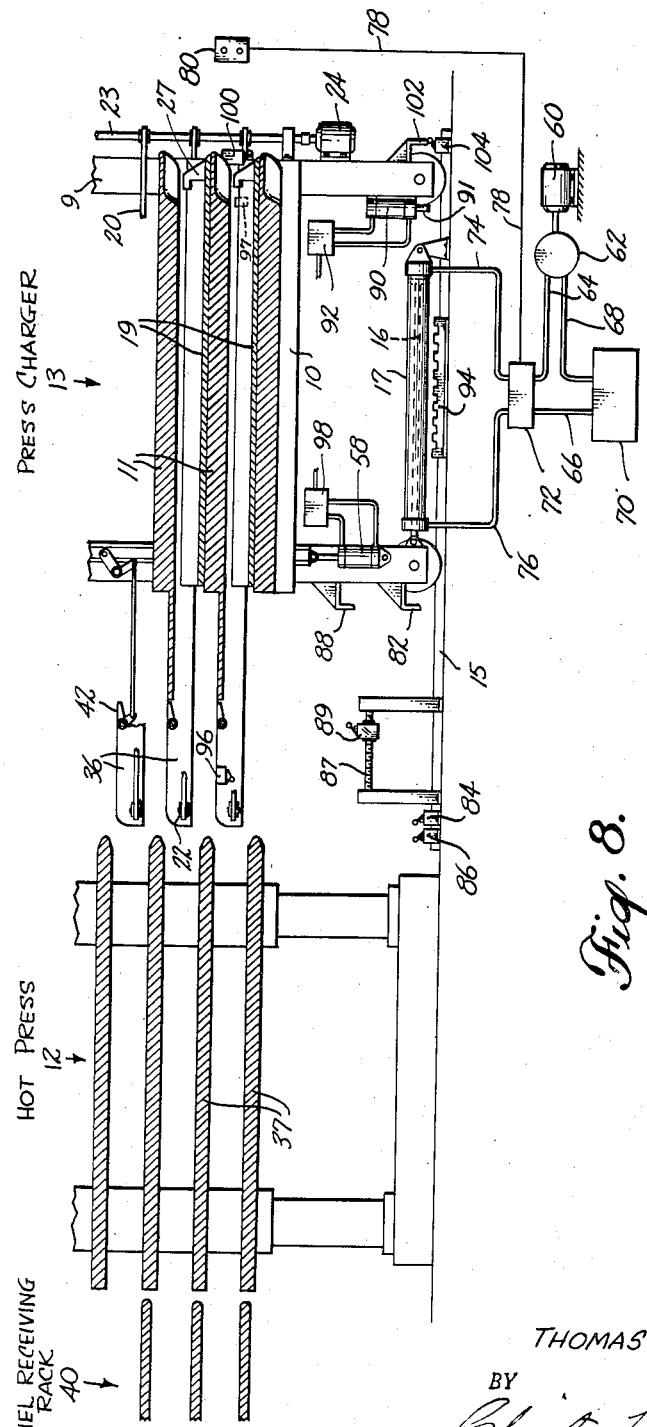

2,872,189

TRAY LOADING MECHANISMS FOR TRANSFERRING A SHEET UNIT TO A RECEIVING SURFACE

Thomas R. Robinson, Everett, Wash.

Application December 10, 1956, Serial No. 627,415

8 Claims. (Cl. 271—54)

My invention relates to a tray type loading mechanism for transferring a sheet unit to a receiving surface, such as is typified by a charger for loading a hot press in the plywood art with a package or book of veneer sheets to be hot pressed to form the final plywood panel. While my invention is not limited to any such specific use, the invention will be described in connection therewith as an example. Obviously somewhat similar problems will be encountered in the transfer of a soft board to be processed by a hot press into a hard board, pulp sheets and other rather large sheet units to be transferred to a desired receiving surface, such as a platen, or the like, of a drying or curing unit.

In the hot pressing of veneer assemblies or packages, having a plurality of superposed veneer sheets with a suitable adhesive between inner veneer faces, to make plywood, a charger having the same number of openings as the openings in the hot press has been employed to decrease the time period of loading the hot press and therefore to increase the production of the hot press.

The prior art hot press chargers have had many shortcomings and common shortcomings related to the high initial cost, operational breakdowns, failure to precisely position the veneer units in the hot press, wear of moving parts, slowness in operation and the like.

It is an object of my invention to provide a charger of the class described which is characterized by structure having a mode of operation which overcomes to a very substantial extent the various shortcoming of the prior art devices.

It is an object of my invention to provide a tray supporting member reciprocably mounted as respects a receiving surface, such as the surface of a hot press platen, and to reciprocably mount, on said tray supporting member, a tray. It is a further object to provide an unloading mechanism for said tray and which unloading mechanism utilizes the relative motion between the tray supporting member and the tray to actuate the said transfer means to "wipe off" or transfer the sheet unit from the tray to the receiving surface.

It is a further object of my invention to provide a transfer mechanism for use in connection with a tray supporting a sheet unit and which transfer mechanism functions to completely transfer the sheet unit to a receiving surface, as a platen, and without relying on frictional contact between the sheet unit and the surface to which it is to be transferred to cause or complete the transfer.

Other objects and advantages of my invention will become apparent as the description of the same proceeds and the invention will be best understood from a consideration of the following detailed descriptions taken in connection with the accompanying drawings forming a part of the specification, with the understanding, however, that the invention is not to be limited to the exact details of construction shown and described since obvious modifications will occur to a person skilled in this art.

Fig. 1 is a perspective view, with parts broken away, of a hot press charger or hot press loading device embodying this invention, and showing a fragment of the hot press to be loaded;

Figs. 2 to 6 inc. are views in longitudinal section, with parts in elevation, illustrating various positions during a cycle of operation of the hot press charger and Fig. 2 is an elevational view, with parts in section, of the device of Fig. 1 alined with a plywood hot press which in turn is alined with a panel receiving rack from the hot press (the latter two structures being shown somewhat diagrammatically, and with the press charger having a charge or package of veneers to be processed and with the hot press having a cured piece of plywood therein to be discharged;

Fig. 3 is a view similar to Fig. 2, with the press charger moved its maximum travel in the direction of the hot press;

Fig. 4 is a view similar to Figs. 2 and 3 and with the trays of the press charger moved their maximum forward amount into the hot press and with a cured piece of plywood discharged from the hot press into the panel receiving rack;

Fig. 5 is a view similar to Figs. 2, 3 and 4 and with the press charger retracted to a predetermined position relative to the hot press (the amount determined by the width of a package of veneers to be processed), the trays have moved relatively forward as respects the press charger while the same was being retracted, and with other parts shown in their relative positions at such period in the cycle;

Fig. 6 is a view similar to Figs. 2, 3, 4 and 5 and showing the relative positions of the various parts upon relative retractile movement of the trays to the packages of veneers to be processed and which packages were carried into the hot press by said trays;

Fig. 7 is a perspective view, on a larger scale, of a fragment of a tray and a depressible or "ducking" dog carried thereby and illustrates the dog shown to the right of Fig. 1 of the drawings; and Fig. 8 is a view similar to Fig. 2 of the drawings and with a somewhat diagrammatic showing illustrating the mode of operation of a device embodying my invention.

Referring now to Fig. 1 of the drawings, a plurality of vertical frame members 9 are illustrated and they support horizontal supports 10, which in turn support vertically spaced horizontal decks 11. The number of horizontal decks 11 will correspond to the number of openings between the platens in the hot press employed. The hot press 12 is somewhat fragmentarily shown in Figs. 1 to 6 inc. and 8, and bears the legend Hot Press; the said hot press charger 13 is shown in more detail in said Figs. 1 to 6 inc. and 8 and with a detail thereof shown in Fig. 7 and bears the legend Press Charger; and the panel receiving rack is shown very diagrammatically in Figs. 2 to 6 inc. and 8 and bears the legend of Panel Receiving Rack.

The press charger 13 is mounted for movement toward and away from the hot press 12 (see Figs. 2 to 6 inc. and 8), as by wheels 14 carried by the press charger 13, and with said wheels 14 mounted for traveling movement on stationary tracks 15. Means for moving the said press charger 13 toward and away from the hot press 12 are illustrated by piston and rod means 16 which are mounted to be urged by pressure in cylinder means 17 so as to urge the press charger 13 either toward or away from the hot press 12, depending upon the operation of suitable valves and associated parts with the piston and rod means 16 and the cylinder means 17. Obviously other means than illustrated may be employed to provide the desired movement of the press charger 13.

The cylinder means 17 has one end portion 18 secured to a relatively fixed support, thus permitting travel of the piston and rod means 16 and the press charger 13 relative to the hot press 12. The control means for operation of the piston and rod means 16 will be discussed later.

Mounted for traveling movement on each deck 11, is a tray member 19. The means to cause each of the tray members 19 to travel relative to its supporting deck 11 comprises endless chains 20, each mounted on spaced apart sprockets 21 and 22. Sprockets 22 are idle sprockets and sprockets 21 are rigid on vertical shafts 23 and the vertical shafts 23 are driven in a desired direction by a reversible motor 24. If the motor 24 is driven in one direction, then the tray members 19 are urged toward the hot press 12 and if said motor 24 is driven in the opposite direction, then each of the tray members 19 is moved away from the hot press 12. It is conventional to employ chain drives in connection with moving trays and hence the showing and description thereof is illustrative and not limiting. Control means for said motor 24 to properly time the operation thereof will be later discussed.

In order to facilitate sliding movement of each of the trays 19 relative to fixed supporting means 9, 10 and 11 therefor, longitudinally extending side rails 25 and intermediate rails 26 are provided for slidingly supporting trays 19. The said side rails 25 and the intermediate rails 26 are illustrated in connection with Fig. 1 of the drawings but the same have not been shown in connection with Figs. 2 to 6 inc. and 8 of the drawings to permit a better showing of other parts of the invention in connection with said Figs. 2 to 6 inc. and 8.

The rear end portion or the portion furthest removed from hot press 12 (see Fig. 1) of each of the trays 19 supports laterally spaced apart "ducking" dogs 27. Referring now to Fig. 7 of the drawings, each "ducking" dog 27 is mounted on a shaft 28 which shaft extends in line with the direction of travel of trays 19. The blade portion 29 of each ducking dog 27 is pivotally mounted on a shaft 28 and the parts are spring loaded by a spring 30 so that the blade 29 tends to assume an upright position as is indicated by full lines in Fig. 7 of the drawings. The depressed or down position of each said ducking dog 27 is illustrated by broken lines in Fig. 7 when the blade portion 29 is within a recess in the upper surface of the tray member 19. The blade portion 29 is normally disposed in a plane which is an angle to the vertical such as 60°. Also the edge portion 31 of each blade 29 is inclined to a line vertical to the axis of shaft 28 and inclines with its upper portion toward the direction of the line of travel of packages to be delivered from the press charger 13 to the hot press 12. When a package 34 of pieces of veneer to be processed engages the edge portion 31 of a blade 29 or when such a package is disposed on such a blade 29, the package will engage a ducking dog 27 and the ducking dog will be readily depressed or "ducked" out of the way so that a package can be urged over and ahead of a ducking dog 27 and the trailing end of the package can be returned firmly against the edge portion 32 of a blade 29, which edge portion is at right angles to the upper surface of a deck-member 19. Thus an operator can urge a package of veneers, which have been assembled and with the glue properly disposed between the faces, on each of the trays 19 and then properly position a package of veneer longitudinally relative to a tray member 19 by urging the bundle over and past a ducking dog and then retract the package so that the trailing edge of the package abuts against the forward edge 32 of a ducking dog 27.

Also each of the ducking dogs 27 has an upper lip portion 33, so that an operator can compress the trailing end portion of a bundle and keep the individual pieces under the said lip 33 to insure that the package will always be moved positively with the movement of the tray member supporting the individual package 34 involved.

Operators manually place a package or bundle of veneer sheets, which are laid up to form plywood after they have been pressed, upon each tray member 19. As the package of veneers 34 is urged against the edge portion 31 of a ducking dog 27 or after the package 34 has been laid upon the ducking dogs 27, the ducking dogs will be urged downwardly and then after the package is urged past the ducking dogs, the operator will then pull the package toward him and against the forward edge portion 32 of a ducking dog 27 and compress the various veneers so that the veneer package 34 will go under the lip portion 33 of each ducking dog 27 involved.

To facilitate manual loading and to provide sufficient room for the hands of an operator within the limits between decks 11 (the spacing between decks 11 being determined by the maximum openings between platens 37 of hot press 12) preferably recesses 35 are provided in the lower portion of each deck 11 which has a tray therebelow.

Each of the trays 19 has a length and a breadth so that the largest package of veneer to be processed in the hot press 12 will lay on a tray 19 without overhanging (see Fig. 1). Very often plywood packages to be processed have a length of 102 inches and a width of 54 inches so that the finished plywood panel has a dimension of 4 feet by 8 feet.

The next step, in the process resulting by employing devices of my invention, is to move the press charger 13 from the position shown in Fig. 2 of the drawings forward to the position shown in Fig. 3 of the drawings. In this latter position, the side arms 36, a pair of which are carried by each deck 11, enter between the platens 37 of the hot press 12. Preferably during travel of the press charger 13 as just described, the trays 19 do not relatively move as respects the said charger 13. Thus if relatively large packages 34 are employed, the trays 19 will only move relative to side arms 36 after said side arms 36 are within hot press 12 and at a time when there is substantially no gap between the platens 37 of the hot press and the decks 11 of the press charger.

The next step involved is to move the tray members 19 relative to the press charger 13 and thus move the trays 19 and the packages 34 supported thereby into the hot press 12 and appropriately between platens 37. The amount of travel of the trays 19 is sufficient so that the forward end portion 38 of each tray 19 will engage with and urge a processed panel 39 completely out of the hot press 12 and into the panel receiving rack which is numbered generally 40.

While all of the packages 34 during one processing in the hot press 12 will have a substantially common width, a particular processing in present day plywood production may involve width, as, 20", 24", 30", 36", 42", and 48". Thus in the construction illustrated, the press charger 13 must return an amount (between Figs. 4 and 5) determined by the common width of the packages 34 being processed so that said packages 34 will be centered in the hot press 12 during processing. In this connection it will be obvious that centering of the packages in the hot press is important as it is common in the plywood art to employ pressures in the order of 250 p. s. i. With such pressures, it is necessary to center the packages 34 and thus balance the press so that substantially equal pressures are on the hydraulic columns employed in connection with a hot press.

As illustrated by the difference between Fig. 4 and Fig. 5 of the drawings, the press charger 13 has not only been retracted but the trays 19 have been moved forward and preferably both of these motions take place at the same time. The press charger 13 is retracted until a suitable lever 88 (Fig. 8) carried by the press charger engages with a stop switch 89 and the stop switch 89 is adjustable toward and away from the hot press 12 and the amount to be adjusted during a given processing period depends upon the common width of the packages 34 to be processed during the next cycle of the hot press 12. In other words, the amount of retractile movement of the hot press charger 13 is such to insure centering of the packages 34 in the hot press 12 so that packages 34 of a common width will be centered in the hot press 12. While the press charger 13 might be initially moved to the position shown in Fig. 5 (rather than moved to the position shown in Fig. 4 and then retracted to the position shown in Fig. 5), I prefer the forward and retractile movements described to give desired stability to trays 19, which may be relatively flexible in construction, and which support the packages 34 as such forward and retractile movement permits the trays to move at a time when the press charger 13 is closely adjacent to the hot press 12.

After the press charger 13 is stopped as indicated in connection with Fig. 5 of the drawings and after the wiping dogs 42 have assumed a wiping position as indicated in said Fig. 5 (the amount of space between the wiping dogs 42 and the trailing edge portion of a package 34 needing to be only a fraction of an inch) then the wiping dogs 42 operate upon relative motion in the proper direction between said wiping dogs 42 and the trays 19. In the drawings the wiping dogs 42 (best shown in Fig. 1 of the drawings) move to wiping position by angular motion or turning from a position where they are out of the way of travel of the trays 19 to a vertical position where their lower end portions are disposed in cross or grooves 43, which grooves are spaced apart and which are disposed in the tray members 19. The means for turning the wiping dogs 42 will be discussed in connection with Fig. 8 of the drawings.

In the construction indicated, the dogs 42 are rigidly carried by cross shafts 44, which cross shafts 44 are rotatably carried by the side arms 36 and which side arms 36 are carried by rigid portions of the press charger 13, such as frame members 9, horizontal supports 10, and horizontal decks 11. Due to the appropriate adjustment of the position of the stop switch 89 (which determines the amount of retractile movement of the press charger 13), the packages of veneer 34 will be completely wiped off of the trays 19 and appropriately centered in the hot press 12.

Obviously if the wiping dogs 42 are mounted on bearings so they will freely turn by advancing packages 34 passing therebelow and if said wiping dogs are fixed by ratchet means preventing turning in a reverse direction, then the means shown to turn the dogs 42 into and out of wiping position may be omitted.

Fig. 6 of the drawings illustrate a position during the wiping action as the packages 34 are being wiped off of the trays 19. The wiping action continues until the packages 34 are completely wiped off of the trays 19 and the next motion is to return the press charger 13 to the position shown in Fig. 2 of the drawings and at the same time return the trays 19 to the position in which they are shown in Fig. 2 of the drawings so that the said trays 19 may be again loaded with appropriate packages 34. The retraction of the tray members 19 and of the press charger 13 preferably is simultaneous to provide for speed of operation.

Preferably there are two wiping dogs 42 on each of the cross shafts 44 to positively aline the trailing edge portion of a package or sheet until 34. Preferably also the grooves 43 are employed in connection with the trays 19 to handle a package comprising a plurality of sheets. Obviously if a single sheet is employed, the grooves 43 may not be advisable. If the wiping dogs 42 are power operated in moving to wiping position and in moving to a position out of wiping, then a construction may be employed where each cross shaft 44 carries a fixed lever 46, connected to a shaft 48 which in turn connects with one arm of the bell crank 50. Each bell crank 50 is pivotally supported on a fixed frame portion of the press charger 13, as one of the vertical frame members 9. The other arm of each bell crank 50 connects with a vertically movable slide shaft 52. This may be accomplished by providing a slot 54 in said arm of the bell crank and a pin 56 carried by the slide 52. The slide 52 carries all of the pins 56 and thus actuates all of the wiping dogs 42. The slide 52 is guided for vertical traveling movement and connects with an air cylinder and piston means 58. The cylinder and piston means 58 is employed to move the wiping dogs into wiping position and also to move said wiping dogs 42 out of wiping position and in a position where packages 34 may pass below said wiping dogs.

Referring now to the somewhat schematic view, Fig. 8, there is illustrated an arrangement in which the controls may be a combination of hydraulic and compressed air means, as well as electrically controlled solenoids to operate the same. It is believed that the schematic showing is sufficient for those skilled in this art and hence unnecessary details have been omitted or schematically shown. An electric motor 60 is energized at all times the device is in use and may be energized by any conventional switching apparatus. The electric motor 60 is coupled with a fluid pump 62 to obtain a source of liquid under pressure. The fluid pump 62 is coupled by suitable conduits 64, 66 and 68 with a tank 70 and a solenoid controlled valve 72 having suitable valving and by-pass means. The said solenoid control valve 72 is connected by conduits 74 and 76 with cylinder means 17 (see also Figs. 2 to 6 inc.) and said valve 72 and said tank 70 are interconnected. Also suitable controls for controlling the proper positioning of the valve mechanism in solenoid control valve 72 may be carried by electrical conduit 78 (indicated diagrammatically by a single line) to a suitable control switch 80. The control switch 80 functions to cause circulating fluid under pressure to enter either conduit 74 or conduit 76 while fluid is exhausting from the other of said conduits or to have pressure not enter either of the said conduits so that the piston and rod means 16 may be stopped at the end of a cycle or at predetermined positions therebetween.

At the start of a cycle, the electrical control switch mechanism 80 is moved to a suitable actuating position, which causes fluid to enter conduit 74 and through the mechanism described, including the cylinder means 17 and piston and rod means 16, and thus causes the press charger 13 to move toward the hot press 12. Actuator bar 82 is carried by the press charger 13 and positioned so that the same will contact a switch mechanism 84 at a suitable time and by change of the contact positions in switch mechanism 84, because of engagement of the actuator bar 82 with suitable mechanism on the switch mechanism 84, a circuit is started which will start motor 24. The position just described is depicted by Fig. 4 of the drawings. Motor 24 as previously described, is a reversible motor and upon starting the same as just indicated, this will start the tray members 19 moving in the direction from the press charger 13 toward the hot press 12. However, the press charger 13 has already moved a distance toward the hot press 12 so that at this time the trays 19 are moving forward and are within the hot press 12. Next the actuator bar 82 engages switch mechanism 86 which through change of its contacts, changes the position of the solenoid control valve 72 and this reverses the direction of travel of the piston and rod means 16 relative to the cylinder means 17 which in turn reverses the travel of the press charger 13 and the same now tends to move away from the hot press 12. This change in movement of the press charger 13 by switch mechanism 86 is not reflected in any change of movement of the tray members 19 as will be later explained. The press charger 13 continues its retractile movement until actuator bar 88 (also carried by the press charger 13 and suitably located) engages switch 87, said shaft 87 is fixed relative to hot press 12. Upon change of position of the switching parts in switch 89, the solenoid control valve 72 moves to a neutral position, thus stopping the retractile movement of the press charger 13 away from the hot press 12. This position is depicted in Fig. 5 of the drawings.

The last mentioned position of the contact means in switch 89 also energizes another circuit. This last mentioned circuit is provided to prevent drifting or undesirable movement of the press charger 13 and parts carried thereby relative to the hot press 12. Such means may include an air operated cylinder 90 and plunger means 91 and a solenoid controlled valve 92 therefor so that upon energizing of the said solenoid control valve 92 as indicated, the plunger 91 operated by cylinder means 90 engages (not shown to clarify the drawings) with the teeth of a rack 94 and which rack 94 is fixed relative to the hot press 12. There may be enough teeth in the rack 94 so that a precise selected position of the press charger 13 obtained by longitudinal adjustment of the adjustable stop 89 can be retained. As the wiping dogs 42 are carried by the press charger 13 and the relative position of said wiping dogs 42 will be determined by the presently discussed stop position of the press charger 13, the said position of the press charger 13 should be precisely determined and drifting should be eliminated—hence the cylinder 90 and plunger 91, solenoid controlled valve 92, and rack 94. The solenoid control valve 92 controls the flow of air under pressure from a source (not shown) to cylinder 90 and plunger means 91.

Previously it was indicated that the movement of each of the tray members 19 controlled from reversible motor 24 was not changed by switch mechanism 86 after they had once been started by switch mechanism 84. The said tray members 19 continue to move forward until an actuator member 97 carried thereby engages a switch member 96 carried by arms 36 (thus switch member 96 and actuator member 97 have one thereof fixed to press charger 13 and the other fixed to a tray 19). The relative positions of 96 and 97 is such that the advancing edge portion 38 of each tray 19 will eject a cured panel from hot press 12 to panel receiving rack 40. Thereafter upon return movement of a tray 19 until the trailing edge portion of a package 34 engages a wiping dog 42, the packages 34 will be wiped off of trays 19 and centered in hot press 12.

When the said switch mechanism 96 is first started (a position depicted by Fig. 5), motor 24 is reversed and solenoid control valve 98 is energized. Reversing of motor 24 will cause the tray members 19 to be returned in a direction towards the press charger 13 and upon energizing of solenoid control valve 98, the air cylinder and piston means 58 will cause the wiping dogs 42 to move to wiping position and at a time when each is behind the trailing end portion of a package 34. The trays 19 continue their retractile movement (a position during retractile movement being depicted in Fig. 6) and at a time when the press charger 13 is held relatively immovable by the cylinder 90 and plunger means 91 and rack 94 until a package 34 is wiped off of each tray 19 and then each tray 19 continues to move until a tray, or a projection carried thereby, engages switch mechanism 100. Upon change of position in the switch mechanism 100: motor 24 stops; cylinder and plunger means 90 disengages from rack 94; and solenoid control valve 72 moves the inlet and outlet discharges of cylinder means 17 so as to cause retractile movement of the piston and rod means 16 from the cylinder means 17 toward its original retracted position. When the said piston and rod means 16 arrives at said original starting position, actuator bar 102 carried by the press charger 13 engages switch mechanism 104 and the change of position of the switch parts in switch mechanism 104 operates through solenoid control valve 72 to stop the travel of piston and rod means 16 relative to cylinder means 17 and also causes a lifting of the wiping dogs 42 so that they move to their normal position which is out of wiping position so that a new cycle can be started when desired.

Due to the fact that the wiping dogs 42 are disposed above the trays 19 and are pivoted to move into and out of the path of travel of a unit 34 on a tray 19 or may be ratchet-like operated, the dogs 42, when in a normal non-wiping position, will not interfere with the loading of units 34 on the trays 19 and conventional hold downs for the packages 34 are eliminated as unnecessary.

In a general way, there has thus been illustrated a tray type loading mechanism or press charger 13 for transferring a sheet unit, such as 34, to a receiving surface such as one of the platens 37 of the hot press 12. In such tray type loading mechanism there has been illustrated tray supporting means such as the horizontal decks 11. The horizontal decks 11 are movable with the press charger 13 and thus are reciprocable with the press charger 13 between a withdrawn position relative to the hot press 12 and to a forward transfer position adjacent said hot press 12 and preferably the side arms 36 enter between the platens 37 of the hot press 12. Next there has been illustrated wiping dog means 42 which are mounted on a forward portion of the arms 36 which are mounted for movement with press charger 13 and the tray supporting decks 11. The said wiping dogs 42 are movable into and out of wiping position relative to the tray members 19 and any sheet units on said tray members 19. The tray members 19 which are adapted to receive thereon a sheet unit to be transferred are mounted for reciprocating movement on the tray supporting horizontal decks 11 and said trays are movable to a forward position where the trailing end of a sheet unit on a tray passes the wiping dogs 42. Also there has been provided means for moving the wiping dogs 42 into and out of engagement with the trailing end portion of a sheet 34 carried by a tray past the wiping dogs 42 so that upon reverse reciprocation of the tray members 19, and by reason of relative movement between a tray 19 and the wiping dogs 42, a unit 34 will be wiped off of a tray and deposited on a receiving surface such as a platen 37 in the hot press 12.

Obviously changes may be made in the forms, dimensions, and arrangements of the parts of my invention without departing from the principle thereof, the above setting forth only a preferred form of embodiment of my invention.

I claim:

1. In tray type loading mechanism for transferring a sheet unit to a receiving surface, tray supporting means reciprocable between a withdrawn position relative to a receiving surface and to a forward transfer position adjacent said surface; wiping dog means mounted on a forward portion of said tray supporting means and movable into and out of wiping position; and movable tray means receiving thereon a sheet unit to be transferred to said receiving surface, said tray means being mounted for reciprocating movement on said tray supporting means and movable to a forward position where the trailing end portion of a sheet unit passes said wiping dog means, whereby upon reverse reciprocation of said tray means after the trailing end portion of said sheet unit has passed said wiping dog means, the trailing end portion of said sheet unit will engage with said wiping dog means and the sheet unit will be wiped off of said tray means.

2. The combination of claim 1 wherein said wiping dog means is pivotally mounted.

3. The combination of claim 1 wherein said wipping dog means is disposed above said tray means and is movable into and out of the path of travel of said tray means.

4. The combination of claim 3 wherein a longitudinally extending groove is provided in the upper surface of said movable tray means and the outer end portion of the wiping dog means is movable into and out of said groove.

5. In tray loading mechanisms for transferring a sheet unit to a receiving surface; tray supporting means reciprocably mounted as respects said receiving surface; tray means carried by said tray supporting means and reciprocably mounted thereon, said tray means receiving thereon a sheet unit to be transferred to said receiving surface; and unloading means, for a sheet unit on said tray means, carried by said tray supporting means, movable behind the trailing edge portion of a sheet unit, and wiping a sheet unit from said tray means upon relative movement of said tray means and said tray supporting means.

6. In tray loading mechanisms for transferring a sheet unit to a receiving surface; tray supporting means reciprocably mounted as respects said receiving surface; tray means carried by said tray supporting means and reciprocably mounted thereon, said tray means receiving thereon a sheet unit to be transferred to said receiving surface; and wiping means carried by said tray supporting means and movable into and out of wiping position relative to said tray means.

7. In tray loading mechanisms for transferring a sheet unit to a receiving surface; tray supporting means mounted for movement toward and away from said receiving surface; tray means carried by said tray supporting means and reciprocably mounted thereon, said tray means receiving thereon a sheet unit to be transferred to said receiving surface; unloading means, for a sheet unit on said tray means, carried by said tray supporting means, movable behind the trailing edge portion of a sheet unit, and wiping a sheet unit from said tray means upon relative movement of said tray means and said tray supporting means; and adjustable means determining the extent of movement of said tray supporting means away from said receiving surface.

8. The combination of claim 7 wherein the unloading means comprises wiping dogs pivotally mounted as respects said tray supporting means, disposed above said tray means, and movable into and out of wiping position relative to a sheet unit on said tray means.

References Cited in the file of this patent

UNITED STATES PATENTS

| | | |
|---|---|---|
| 1,174,747 | McDonald | Nov. 7, 1916 |
| 2,039,699 | Biazzi | May 5, 1936 |